Dec. 14, 1943.   P. FILIPPONE   2,336,607
SPRING WHEEL
Filed Aug. 17, 1942   3 Sheets-Sheet 1

INVENTOR,
Paolo Filippone
BY
Victor J. Evans & Co.
ATTORNEYS

Dec. 14, 1943.  P. FILIPPONE  2,336,607

SPRING WHEEL

Filed Aug. 17, 1942  3 Sheets-Sheet 2

INVENTOR,
Paolo Filippone
BY
Victor J. Evans & Co.
ATTORNEYS

Dec. 14, 1943. P. FILIPPONE 2,336,607
SPRING WHEEL
Filed Aug. 17, 1942   3 Sheets-Sheet 3
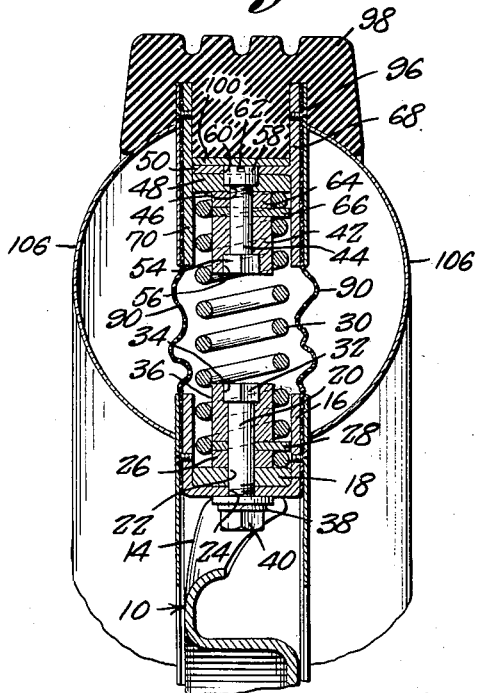
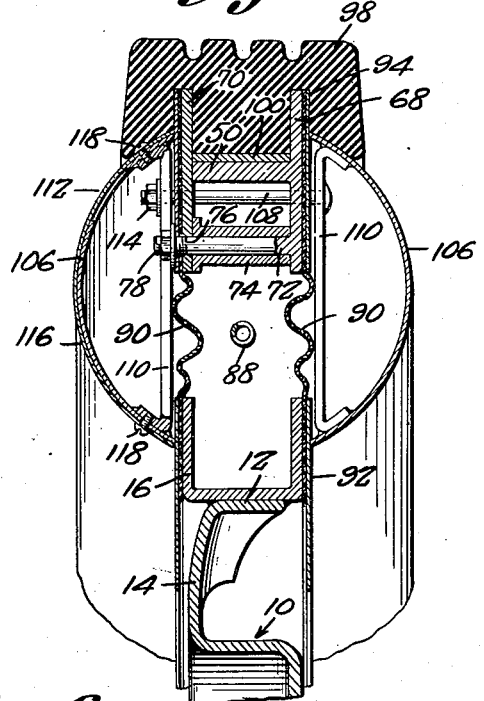
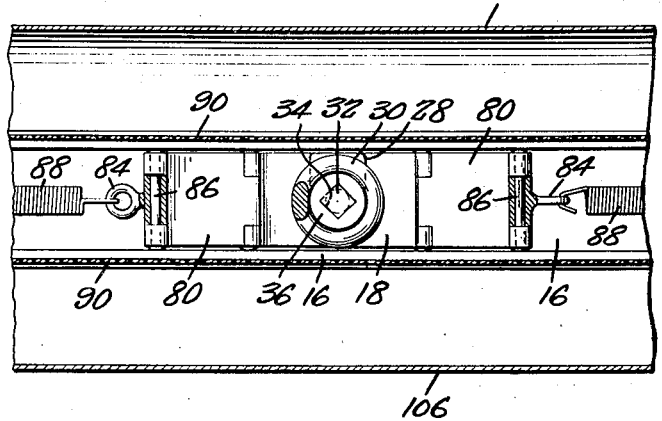
INVENTOR,
Paolo Filippone
BY
Victor J. Evans & Co.
ATTORNEYS Patented Dec. 14, 1943

2,336,607

UNITED STATES PATENT OFFICE 2,336,607

SPRING WHEEL

Paolo Filippone, Brooklyn, N. Y., assignor of one-half to Stephen Gagliardo, Brooklyn, N. Y.

Application August 17, 1942, Serial No. 455,107

7 Claims. (Cl. 152—97)

My invention relates to automotive vehicles, and other types of carriers requiring pneumatic or cushioned wheels, and has among its objects and advantages the provision of an improved spring wheel.

In the accompanying drawings:

Figure 4 is an enlarged sectional view taken along the line 4—4 of Figure 3.

Figure 5 is an enlarged sectional view along the line 5—5 of Figure 3, and

Figure 6 is an enlarged sectional view taken substantially along the line 6—6 of Figure 3.

Figure 1:
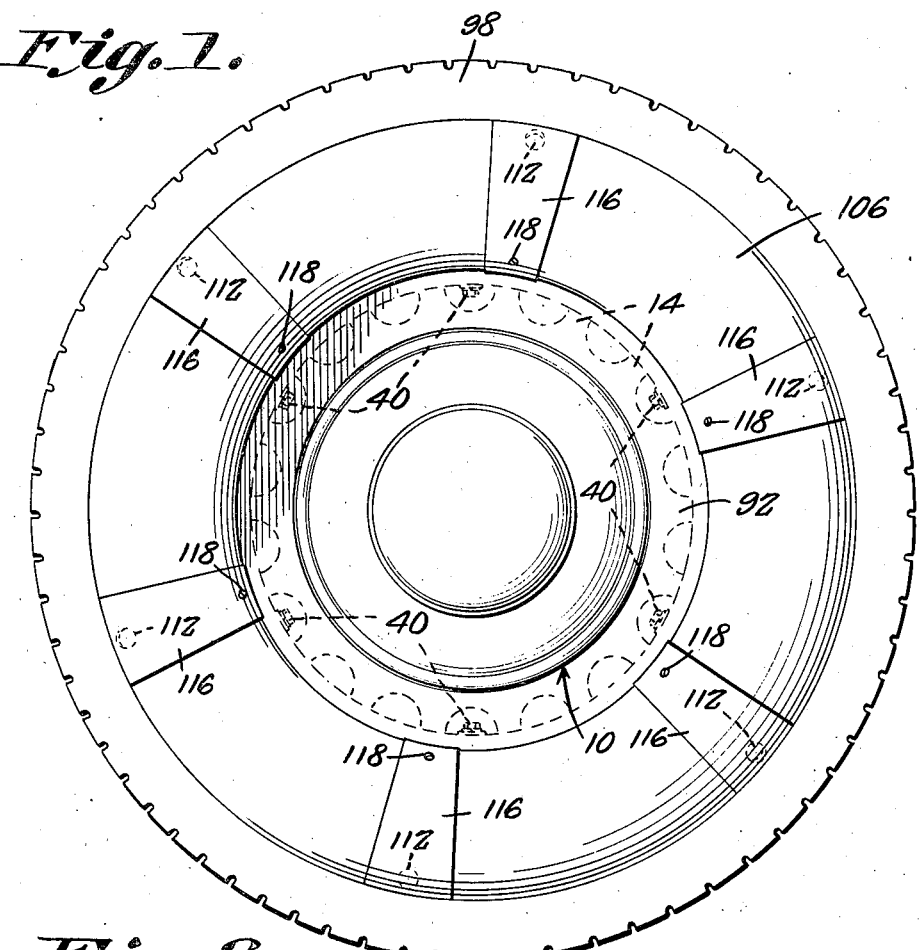
Figure 1 is a side view of the wheel.
Figure 2:
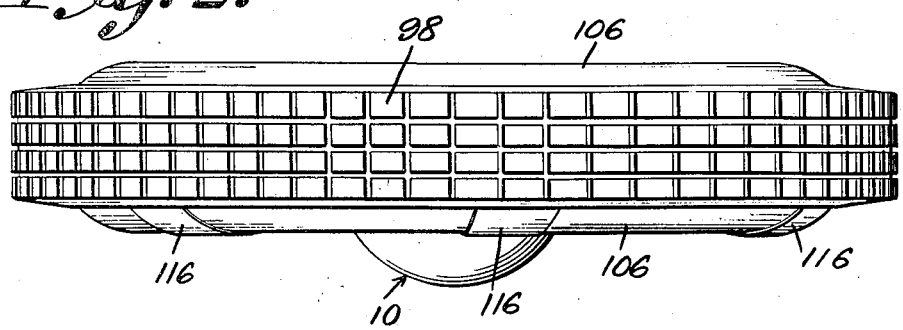
Figure 2 is an edge view.

In the embodiment of the invention selected for illustration, I make use of a steel hub structure 10 such as is employed in conventional types of automobile wheels. To the flanges 12 of the hub structure leg elements 14 is fixedly secured a channel 16, as by welding. This channel extends circumferentially of the hub structure in the plane of the wheel as a whole.

To the channel 16 is attached a plurality of equally spaced U-shaped brackets 18, the bights of the brackets engaging the bight of the channel 16. Bolts 20 fixedly secure the brackets to the channel. In Figures 4 and 6, the bolt 20 illustrated therein passes through an opening 22 in the bight of the bracket 18 and through an opening 24 in the bight of the channel 16. The bracket 18 has snug fitting engagement with the side flanges of the channel 16 so as to be restrained from rotation about the axis of the bolt 20. All the brackets are of similar construction and secured to the channel 16 in the same manner, so that the description of one applies to all.

Upon the bolt 20 of Figure 4 is mounted a washer 26, which is interposed between the bight of the bracket 18 and a lock washer 28 mounted on the bolt 20 and having one end inserted between convolutions of a compression spring 30 having its inner end engaging the bight of the bracket 18. The lock washer 28 has one end lying in engagement with one side flange of the channel 16. The bolt head 32 lies in a correspondingly shaped recess 34 in a sleeve 36 mounted on the bolt 20 and lying in engagement with the lock washer 28. A split lock washer 38 is interposed between the bight of the channel 16 and the nut 40 threaded on the bolt 20.

The spring 30 of Figure 4 has its outer end inserted over a sleeve 42 mounted on a bolt 44. This bolt extends through an opening 46 in the bight of a bracket 48 identical with the bracket 18. However, the bracket 48 is attached to a wheel rim 50 by screws 52, as in Figure 3. The bolt head 54 of Figure 4 lies in a recess 56 in one end of the sleeve 42, and the bolt nut 58 lies in an opening 60 in the wheel rim 50 and is provided with a screw driver slot 62.

Between the bight of the bracket 48 and the sleeve 42, see Figure 4, are interposed a washer 64 and a lock washer 66, the latter corresponding to the lock washer 28. The nut 58 terminates flush with the outer face of the wheel rim 50. The outer end of the spring 30 lies in engagement with the bracket 48, and the lock washer 66 is projected between convolutions of the spring. Thus the two lock washers 28 and 66 restrain the spring 50 from accidental disconnection from the sleeves 26 and 42, although the two sleeves are spaced sufficiently far apart to accommodate the necessary compression of the spring 30 to lend flexibility to the spring wheel. To one edge of the wheel rim 50 is fixedly attached a flat ring 68, this ring extending substantially equal distances outwardly and inwardly of the wheel rim. Abutting the opposite edge of the wheel rim 50 is a ring 70 of the same size and arrangement as the ring 68, the two rings 68 and 70 cooperating with the wheel rim 50 to provide a channel like structure within which are mounted all the brackets 48.

The ring 68 is provided with bolts 72 fixed thereto and extending through spacing sleeves 74 engaging both rings 68 and 70, as illustrated in Figure 5. The bolts 72 extend through openings 76 in the ring 70 and are provided with nuts 78 so that the two rings may be clamped into a unitary structure, with the ring 70 engaging the wheel rim 50.

Figure 3:
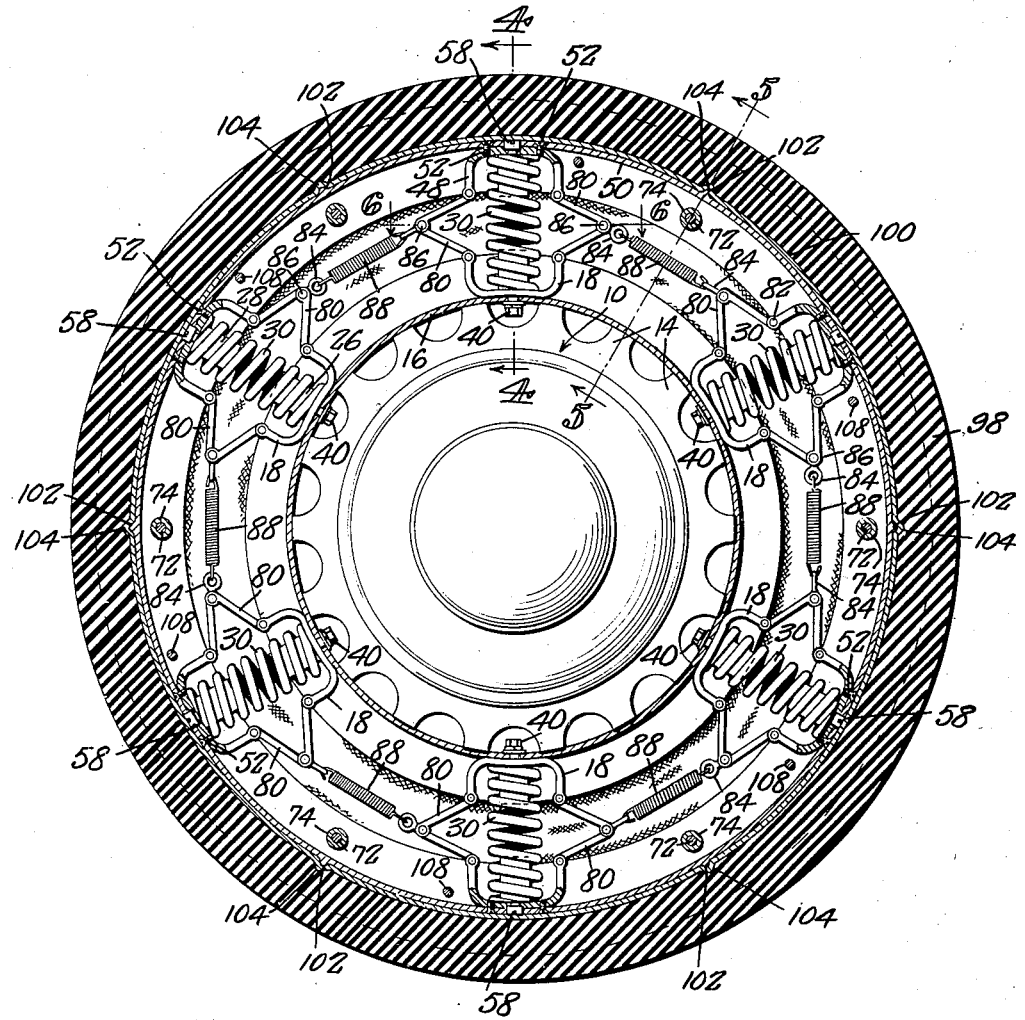
Figure 3 is a vertical sectional view.

Hinge members 80 are pivotally connected at 82 with the brackets 18 and 48, see Figure 3. Two hinges connect with each of the brackets 18 and 48. Eyes 84 are pivotally mounted on the hinge pins 86, see Figure 6. Tension springs 88 respectively connect the eyes 84, as in Figure 3, so that the two hinges 80 associated with one spring 30 are respectively connected with one hinge 80 associated with two adjacent springs 30. All the springs 88 are under initial tension when assembled in the wheel structure and operate to maintain a pull on the relatively movable parts to eliminate lost motion and consequent noise.

Figures 4 and 5 illustrate protective walls 90 for the springs 30, the hinges 80 and their connecting springs 88. The walls 90 may comprise fabric contoured in the nature of rings and cemented to plate rings 92 and 94 lying facewise to the channel 16 and the rings 68 and 70, respectively. While the walls 90 are cemented to the rings 92 and 94, the walls are also firmly clamped between the rings and the channel 16 and the two walls 68 and 70 by screws 96 threaded into the channel and the two rings 68 and 70. The walls 90 function as a housing to prevent dirt and the like from accumulating in and about the springs 30 and their associated parts.

A tread body 98 is mounted on the rings 68 and 70 and the wheel rim 50. In Figure 3, the body 98 is attached to a band 100 of such diameter as to slip over the wheel rim 50. Lugs 102 are formed on the wheel rim 50 to lie in notches 104 in the band 100 to restrain the band and the body 98 from relative rotation with respect to the wheel rim 50.

Decorative covers 106 are attached to the rings 68 and 70 by bolts 108 extending through openings in brackets 110 welded to the covers 106. Figures 4 and 5 illustrate the covers 106 as being bowed outwardly with their edges lying in contact with the rings 92 and 94. The body 98 also overlies a narrow outer peripheral margin of the two covers. While the covers are held somewhat firmly against the rings 92 and 94, the covers may move relatively to the rings 92, as when the outer section of the wheel structure moves relatively to the hub structure. The bolts 108 extend through openings in the rings 68 and 70 so that the covers 106 lie permanently in engagement with the body 98.

One of the covers 106 is provided with a plurality of openings 112 to lend access to the nuts 114 threaded on the bolts 108. Cover plates 116 are provided for covering the openings 112, which cover plates are detachably connected with the brackets 110 of that cover 106 by screws 118.

In operation, both sets of brackets 18 and 48 are restrained from rotation. The hinge like members 80 are of considerable width which is also true of the brackets 18 and 48, so that the outer part of the wheel is constrained to lie in the plane of the hub structure, thereby eliminating relative movement between these parts of the wheel when in a turn, although the outer part of the wheel structure is resiliently connected with the hub structure at all times.

While the covers 106 are contoured for decorative purposes, these covers may be shaped from heavy material to provide bulletproof shields for the resilient mechanism of the wheel. This will afford complete protection for the spring mechanism.

Without further elaboration, the foregoing will so fully explain my invention, that others may, by applying current knowledge, readily adapt the same for use under various conditions of service.

I claim:

1. A spring wheel comprising a hub structure having a first annular member, a road wheel part having a second annular member arranged circumferentially of the first annular member, compression springs between said first and second annular members, and tension springs each having two connections with said first annular member and two connections with said second annular member.

2. A spring wheel comprising a hub structure having a first annular member, a road wheel part having a second annular member arranged circumferentially of the first annular member and spaced therefrom, compression springs arranged radially between said first and second annular members, and tension springs arranged circumferentially of the wheel between the first and second annular members and each having two connections with the respective first and second annular members.

3. A spring wheel comprising a hub structure having a circumferential band like member, a road wheel part having a rim member arranged circumferentially of said band like member, brackets respectively attached to said band like member and said rim member, compression springs interposed between the brackets on said band like member and said rim member, hinges respectively connecting the brackets on said band like member with said rim member, and tension springs arranged circumferentially of the wheel and connecting said hinges one with the other.

4. The invention described in claim 1 wherein said second annular member comprises a rim constituting a mount for the outer ends of said compression springs, a first flange fixed to said rim, a second flange abutting said rim, and bolts fixedly relating the first and second flanges and said rim.

5. The invention described in claim 1 wherein flexible walls are connected with said hub structure and the road wheel part, and outwardly bowed covers fixedly connected with said road wheel part and slidably connected with said hub structure.

6. The invention described in claim 1 wherein pin like means are attached to said hub structure to support the inner ends of said compression springs, washers on said pin like means extending through convolutions of the compression springs to restrain the latter from accidental disconnection from said pin means, second pin means attached to said road wheel part to constitute supports for the outer ends of said compression springs, and washer means on said second pin means extending through convolutions in said compression springs to restrain the latter from accidental displacement with respect to the second pin means.

7. The invention described in claim 1 wherein said road wheel part includes a rim means, a tread body having a band insertable over said rim means, and means restraining said band from circumferential rotary movement relative to said rim means.

PAOLO FILIPPONE.